United States Patent [19]

Hotta et al.

[11] Patent Number: 4,781,266
[45] Date of Patent: Nov. 1, 1988

[54] TWO-WHEEL/FOUR-WHEEL AUTOMATIC CHANGE-OVER DEVICE IN AUTOMOBILE TRANSFER APPARATUS

[75] Inventors: Junichi Hotta, Nagoya; Yuichi Fukuhara, Chiryu; Kenji Takeuchi, Hoi, all of Japan

[73] Assignee: Aisin Seiki Kabushiki Kaisha, Aichi, Japan

[21] Appl. No.: 9,254

[22] Filed: Jan. 30, 1987

[30] Foreign Application Priority Data

Jan. 31, 1986 [JP] Japan ................................ 61-19253

[51] Int. Cl.$^4$ ............................................ B60K 23/08
[52] U.S. Cl. .................................. 180/248; 180/197; 180/247; 192/103 F
[58] Field of Search ............... 180/197, 233, 247, 248, 180/249, 250, 76; 192/85 AA, 103 F; 74/650, 856, 862

[56] References Cited

U.S. PATENT DOCUMENTS 4,458,557  7/1984  Hayakawa ........................... 180/233
4,556,134  12/1985  Takano ............................ 192/103 F

FOREIGN PATENT DOCUMENTS 3145279  5/1983  Fed. Rep. of Germany ...... 180/233
135327  7/1985  Japan .................................. 180/248

Primary Examiner—John J. Love
Assistant Examiner—Everett G. Diederiks, Jr.
Attorney, Agent, or Firm—Burns, Doane, Swecker & Mathis

[57] ABSTRACT

A two-wheel/four-wheel automatic change-over device in an automobile transfer apparatus is disclosed. In the transfer apparatus in which driving forces are transmitted directly from a transmission to front two wheels or rear two wheels and also transmitted through a wet-type multiple disc clutch to the other two wheels, the two-wheel/four-wheel change-over device has a change-over control unit for changing over from two-wheel drive to four-wheel drive. This unit automatically effects an engagement and a release of a wet-type multiple disc clutch in response to a signal of high speed travelling, a signal of slope travelling, a signal of quick acceleration travelling, a slip signal obtained from a relation between a real car speed and rotation of the wheels and a signal of a selector switch. In such a constitution, the wet-type multiple disc clutch is usually hydraulic-controlled so that it is differentiable in time of the four-wheel travelling. The direct connection type four-wheel drive or the two-wheel drive is performed in accordance with those signals with no time-lag. With this arrangement, a tight corner brake phenomenon can be avoided.

4 Claims, 4 Drawing Sheets

TWO-WHEEL/FOUR-WHEEL AUTOMATIC CHANGE-OVER DEVICE IN AUTOMOBILE TRANSFER APPARATUS

BACKGROUND OF THE INVENTION

1. Field of the Invention

The present invention relates to a two-wheel/four-wheel change-over device in an automobile transfer apparatus wherein the change-over device usually serves as a direct connection type transfer apparatus and is capable of changing over to two-wheel drive upon demand.

2. Description of the Prior Art

A conventionally proposed control unit in an automobile transfer apparatus disclosed in the specification of Japanese Utility Model Publication No. 55055/1981 involves a mode of operation (an easy drive mode) in which a central differential is provided. Driving forces can be imparted to individual wheels in proportion to a distribution ratio even when the four wheels respectively have a difference of rotation (no undesirable influence is exerted on the rotation of the wheels).

The driving forces are, however, determined by a coefficient of friction between tires, road surface and the car weight that is to be applied to the tires, so that a slip-state could be created even in a single wheel. As a result, other wheels come to have the driving forces corresponding to a degree to which the gripping power is reduced. Hence, it is required to prepare a lock mechanism for avoiding such a situation. Addition of this lock mechanism, however, makes a structure of the transfer apparatus more complicated.

In another transfer apparatus wherein two-wheel/four-wheel drive, which is referred to as a part-time mode, is manually changed over when four-wheel drive travelling is carried out, the driving forces of all the wheels are, as described above, by no means solely determined by the gripping power of one wheel. However, when the wheels rotate, the rear wheels travel inside the front wheels, i.e., understeer. Since no difference of rotation exists between a front propeller shaft and a rear propeller shaft, there is produced a so-called stick slipping phenomenon, i.e., a tight corner braking phenomenon wherein the difference of rotation escapes, such a phenomenon existing between the road surface and the tires. This causes defects such as abrasion of the tires, increases cost of fuel, and the riding comfort is decreased by vibration noises.

In order to solve the above-described problems, as is disclosed in the specification of Japanese Utility Model Publication No. 26636/1983, a full-time type four-wheel driving device is proposed. This device is arranged such that a clutch engaging state which ordinarily permits a slide by forces provided by springs, and when the rotational difference, i.e., slip between the front and rear wheel is created, completed integration is obtained with the aid of a hydraulic piston. In examining travelling conditions of the automobile, however, there is a difference in the amount of air in the tires of the front and rear wheels, and further a difference in load-radius between the tires which is caused by loading of the vehicle. Therefore, the clutch member may be fixedly engaged, this leading to problems of friction loss of the clutch and an increase in heat.

Under ordinary conditions of travelling (on dry and flat surface of a concrete road), the two-wheel travelling is sufficient and four-wheel travelling is not required. Besides, the four-wheel travelling has disadvantages pertaining to noise and the cost of fuel. An additional problem incidental to four-wheel travelling is that when diminishing a time-lag between increasing a predetermined pressure and attaining the complete engagement of the clutch by operating the hydraulic piston after detecting a slip-rate, a hydraulic pump having a large capacity has to be utilized and the power needed to drive the pump results in an increase in the cost of fuel.

SUMMARY OF THE INVENTION

The primary object of the present invention which obviates such problems inherent in a conventional automobile transfer apparatus as advancement of abrasion of tires, an increase in cost of fuel, deterioration of riding conditions which is caused by vibration and by noise, a friction loss in the transfer clutch and a rise in heat is to provide, in a transfer apparatus constructed such that driving forces are transmitted directly from a transmission to one set of front or rear two-wheels and are at the same time transmitted through a wet-type multiple disc clutch to another set of two-wheels, a two-wheel/four-wheel automatic change-over device in an automobile transfer apparatus. A change-over control unit is provided for changing over from two-wheel drive to four-wheel drive in a four-wheel driving automobile, this unit automatically effecting both an engagement and a release of the wet-type multiple disc clutch in response to a signal of high-speed travelling, a signal of slope travelling, a signal of quick acceleration travelling, a slip signal obtained from a relation between a real car speed and rotation of the wheels and a signal of a selector switch, wherein the wet-type multiple disc clutch is usually so hydraulic-controlled as to be differential in time of the four-wheel travelling, and wherein the direct four-wheel drive or the two-wheel drive is performed in accordance with the above-mentioned signals with no time-lag.

Under two-wheel travelling conditions (more than a preset car speed), no hydraulic pressure is transmitted to the clutch member and a completely free state, is maintained, and at the same moment an electrically-driven free wheel hub is released from engagement. The cost of fuel and the noises are decreased by completely halting a propeller shaft and a differential which are provided on the front side. Under four-wheel travelling conditions (less than the preset car speed), the hydraulic pressure applied to the clutch is set at a low level; a loss of power which is caused by pump-drive is reduced except for a completely connected state of the clutch; and simultaneously the time-lag created during an operation to change over from a differential four-wheel state to a direct four-wheel state is minimized when detecting a wheel slip condition.

On the other hand, under low-speed rotating conditions (the tight corner brake phenomenon), the hydraulic pressure acting on the clutch is arranged to be at a low level; a differential motion of the clutch member is facilitated thereby to avoid the brake phenomenon; and the change-over operation is so effected as to eliminate both the deterioration in operation which is caused by occurrence of the wheel slip and the loss of power by immediately applying the preset pressure (a middle level pressure in time for the quick acceleration after undergoing the rotating conditions.

These and other objects, features and advantages of the invention will become more apparent on reading the following description with reference to the accompanying drawings.

DETAILED DESCRIPTION OF A PREFERRED EMBODIMENT

Figure 1:
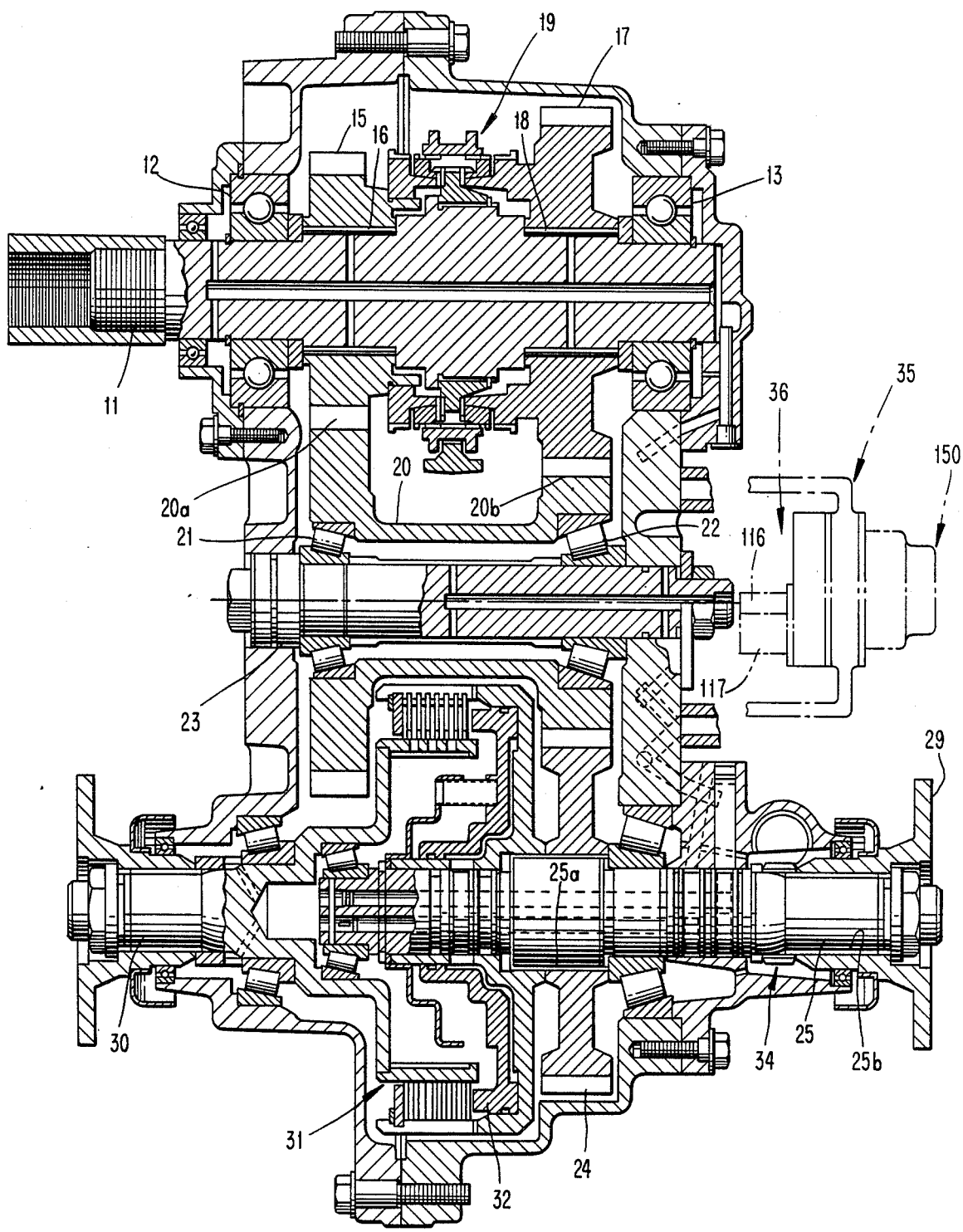
FIG. 1 is a side sectional view of a two-wheel/four-wheel automatic change-over device, showing an embodiment of the present invention.

An embodiment of the present invention will hereinafter be described with reference to the accompanying drawings. FIGS. 1 to 4 in combination show an embodiment of the present invention. At the first onset, referring to FIG. 1, there is shown a power transmitting system. In the Figure, the reference numeral 11 stands for an input shaft which is integrally connected to an output shaft (not illustrated) of a transmission. The input shaft 11 is rotatably supported on bearings 12, 13. The numeral 15 represents a low speed stage input gear, 17 denotes a high speed input gear, these two gears being rotatably supported through needle bearings 16, 18 on the input shaft 11. On the input shaft 11 a synchronizing device 19 is provided to facilitate a change-over operation during the travelling.

The numeral 20 designates an idler gear. An idler gear 20a meshes with the input gear 15 and an idler gear 20b engages with the input gear 17 are integrally formed. The idler gears 20a, 20b are rotatably supported through tapered bearings 21, 22 on an idler shaft 23. The numeral 24 denotes an output gear which is in mesh with the idler gear 20b. The output gear 24 is fixedly fitted to a rear output shaft 25 with the aid of a spline 25a. A rear flange 29 is fixedly fitted to a spline 25b of the output rear shaft 25. In such a construction, driving forces are transmitted via a propeller shaft (not illustrated) to a rear differential. The numeral 31 represents a hydraulic clutch member. This hydraulic clutch member 31 is constructed so that the power is imparted to a front output shaft 30 when actuating a hydraulic piston 32. The numeral 34 designates a sensor for detecting a rotational velocity of the output rear shaft 25 and 35 indicates a hydraulic unit for controlling engagement and release of the hydraulic clutch 31. A valve body unit is shown at 36 for controlling a hydraulic pressure applied to the piston 32. A DC motor is shown at 150 for driving an oil pump 118 which is built in the valve body unit 36.

Figure 2:
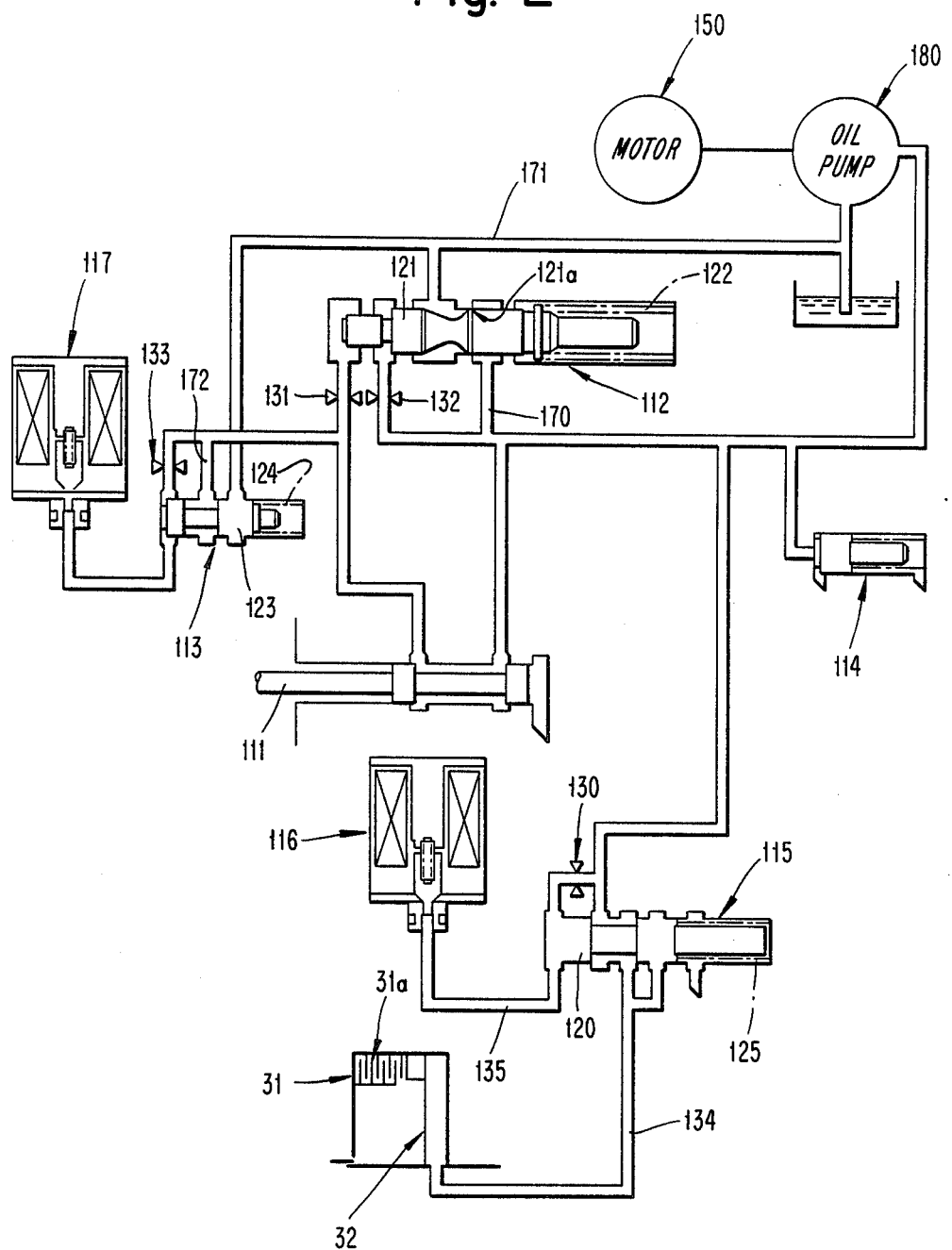
FIG. 2 is a hydraulic pressure circuit diagram thereof.

A hydraulic circuit which controls the engagement and release of the hydraulic clutch 31 is described with reference to FIG. 2. The numeral 111 stands for a manual valve, the other end (not illustrated) of which is formed as to be integral with a shift shaft for actuating the synchronizing device 19. Referring to the same Figure, there is depicted a high-velocity shifting state wherein the hydraulic pressure is kept at a middle level. When the manual valve 111 is moved to the left hand, the circuit is changed into a low-velocity shifting state, and at the same instant the hydraulic pressure is brought to a high level.

The numeral 112 represents a regulator valve, 113 represents a modulator valve and 114 denotes a check valve. The numeral 115 designates a change-over valve. The valve system comprises solenoid valves 116, 117 and the aforementioned manual valve 111.

Operation of the hydraulic circuit is described as follows. Oil discharged from an oil pump 180, which is driven by a motor 150, fills an oil passage communicated with the pump 180, so as to increase the hydraulic pressure. Since the solenoid 116 remains closed, the hydraulic oil passing through an orifice 130 causes a spool 120 to move in the right direction, as shown in the figure, against a spring force of spring 125. The hydraulic oil flows into the piston of the hydraulic clutch 31 and the piston is thereby moved to the left hand direction. As a consequence, the clutch 31a is brought into engagement. The hydraulic oil passing through orifices 131, 132 causes a spool 121 to move in the right-hand direction and is brought into equilibrium with a load produced by the spring 122 (as shown in the Figure), in which state an increase of the hydraulic oil is adjusted. When the equilibrium is lost the pressure goes up and the spool 121 is moved further in the right-hand direction. However, the hydraulic oil within the oil passage 170 is communicable from a pressure adjusting member 121a into an oil discharge passage 171, whereby the oil pressure is lowered. Hence, the hydraulic oil is kept constant. Under such circumstances, a spool 123 of the modulator valve 113 is positioned to the left, as shown in the drawing, by means of a spring 124. The reason for this is that the solenoid 117 remains open and the hydraulic oil passing through an orifice 133 flows into the oil discharge passage, so that it is impossible to overcome the spring force of the spring 124.

Upon shifting from the middle pressure range indicated in the Figure to the lower pressure range, the solenoid 117 is changed from the open state to the closed state, so as to move the spool 123 of the modulator valve 113 in the right-hand direction. As a result, the hydraulic oil within the oil passage 172 begins to flow into the oil discharge passage 171. Due to the draining of the oil, the pressure of the hydraulic oil in the circuit is decreased from the middle pressure level to the low pressure level.

Four-wheel drive of the vehicle at a high-speed range is thus far set forth. It is possible to change over from four-wheel drive to two-wheel drive by changing over the solenoid 116 from the closed state to the open state. When the solenoid 116 is open, the hydraulic oil running through the orifice 130 is discharged and hence the pressure of an oil passage 135 is lowered. The spool 120 is moved in the left direction by the force of the spring 125, thereby closing an oil passage 134. Inasmuch as the hydraulic oil which causes the engagement of the hydraulic clutch 31 is drained, the clutch is released. The drive system is thus changed from four-wheel drive to two-wheel drive. The solenoid 117 in the two-wheel drive is arranged to be in the closed state. The hydraulic oil within the circuit is held under low pressure by the modulator valve 113 and it is therefore possible to shorten the time-lag produced during the change-over operation from the two-wheel drive to the four-wheel drive. The motor 150 for driving the oil pump 118 needs less power because of the low pressure, which brings about a decrease in consumption of electricity.

Where the hydraulic clutch 31 requires a higher operating pressure, i.e., high capability of torque transmission, namely, when being changed to the low-speed range state, the manual valve 111 is moved in the left-hand direction. consequently, the hydraulic oil which flows in the orifice 131 is shut off and the regulator valve 112 is adjusted to hold the high pressure between the hydraulic oil passing through the orifice 132 and the spring 122. In this case, the solenoid 116 is kept in the closed state and the four-wheel drive is constantly maintained.

Table 1 shows the speed changing stages, the hydraulic states and the open and closed states of the solenoid in the form of a matrix.

TABLE 1

| Speed changing stages | | Pressure applied to hydraulic clutch | Solenoid 116 | Solenoid 117 |
|---|---|---|---|---|
| Low speed change | Direct four-wheel drive | High pressure | Closed | Closed |
| High speed stage | Differential four-wheel drive | Middle Pressure Low pressure | | Open Closed |
| | Two-wheel drive | 0 | Open | |

Figure 3:
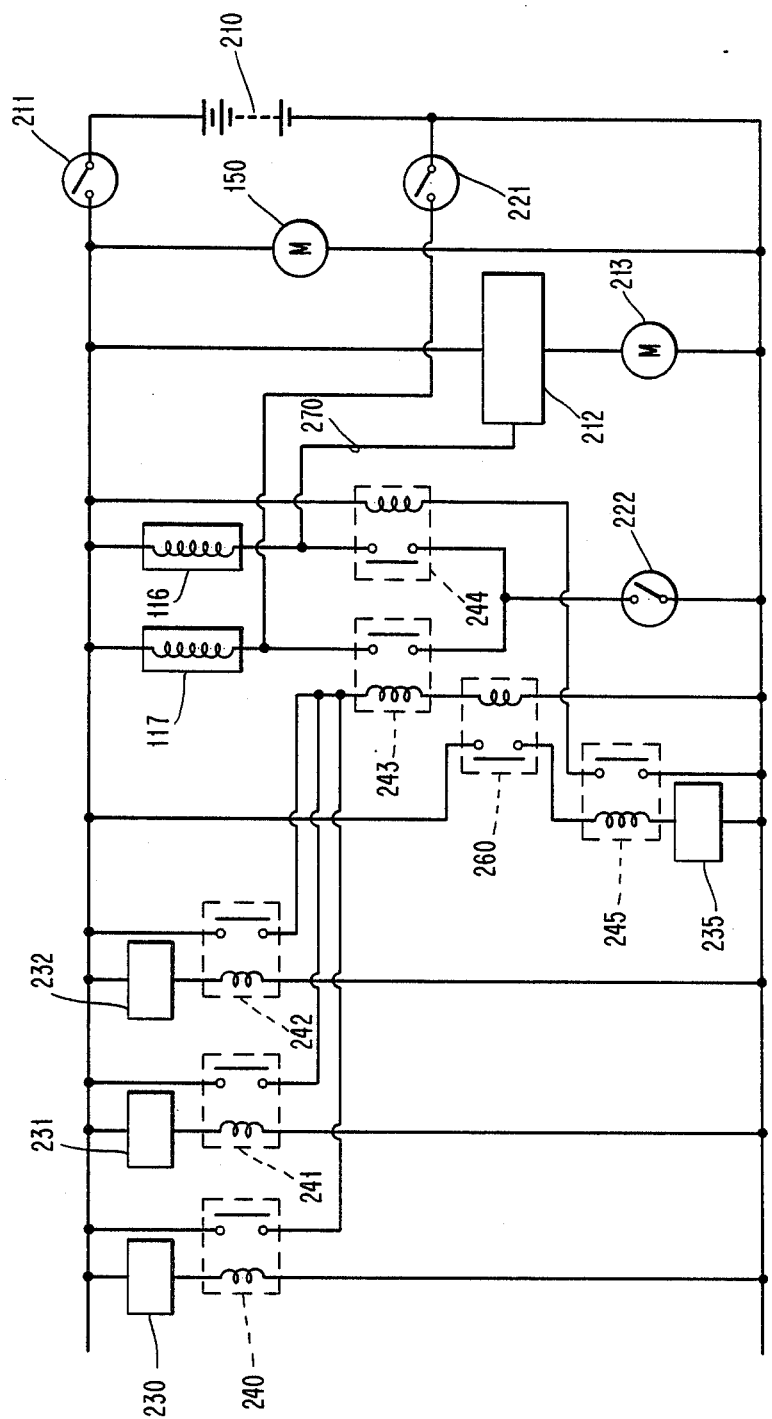
FIG. 3 is an electric circuit diagram thereof.

The electric circuit for controlling the above-described hydraulic circuit will hereinafter be described with reference to FIG. 3. A battery 210 has connected thereto an oil pump driving motor 150 which is turned ON through an ignition switch 211 and a free wheel hub driving motor 213 which is turned ON through a control circuit 212 for controlling the operations of an electrically-driven free wheel hub. When turning ON a selector switch 221, a solenoid 117 is charged with electricity and the direct four-wheel drive is maintained. The selector switch 222 functions so that current is supplied with the help of a relay 243 and the solenoid 117 to a slope control circuit 230 which actuates a relay 240 after ascertaining a slope; to a quick acceleration circuit 231 which actuates a relay 241 after detecting a quick acceleration state; and, to a slip control circuit 232 which actuates a relay 242 after ascertaining an occurrence of slip during travelling under such conditions as a swamp, an icy road, etc. Furthermore, a high-speed travelling ascertainment circuit 235 actuates a relay 245 after ascertaining a the high-speed travelling is charged with the current through the intermediary of a relay 244 and the solenoid 116. When the relay 245 is operated with the slope control circuit being charged, a relay 260 is set which makes the relay 245 nonfunctional, i.e., the solenoid 116 is not operated.

The operations which are to be performed when the selector switch 222 is turned ON will hereinafter be described. When the slope control circuit and other circuits do not actuate the respective relays, the solenoids 116, 117 are in the closed state and differentiable four-wheel drive can be obtained. Subsequently, it is possible to avoid the tight corner brake phenomenon, discussed supra, that is present when the low-speed steering is performed. In such a state, when any one of the relays 240, 241, 242 is actuated and is then electrically charged, the relay 243 is likewise charged. The solenoid 117 is changed from the closed state to the open state, whereby the change-over operation from the differential four-wheel drive to the direct four-wheel drive is automatically carried out.

The driving forces under such conditions as a loss in power which is caused by the slip, ascent and descent of a slope and quick acceleration are equally distributed to the four wheels.

A situation where the relay 245 is operated will be explained as follows. The relay 245 is arranged to be operated when exceeding a given car speed. The driving forces that are to be imparted to the front wheels are shut off by cutting a supply to the hydraulic clutch 31 after changing the solenoid 116 from the closed state to the open state through the relay 244. Immediately after the solenoid 116 has been electrically charged, the control circuit 212 is electrically charged from a connection 270, and the relays which are set in the internal circuits begin to function. Subsequently, the free wheel hub driving motor 213 is reversely rotated, thereby releasing the engagement of the hub. In this state, the travelling is completely changed to the two-wheel drive. It is therefore possible to attain lower noises and a lower cost of fuel due to the absence of a differential and a propeller shaft. It is to be noted that FIG. 4 is a flow-chart showing the individual operations of the hydraulic control and the electric control.

Figure 4:
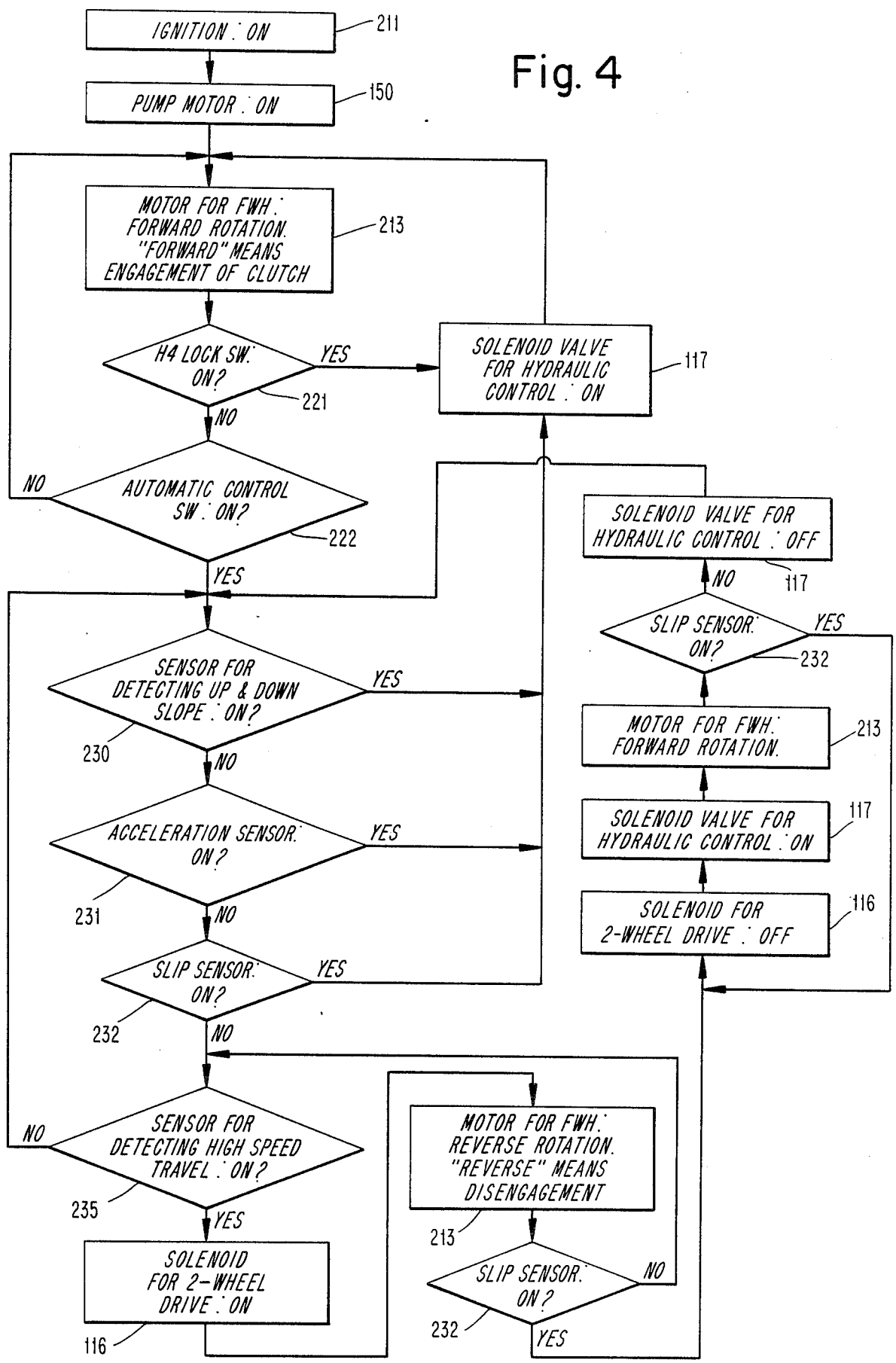
FIG. 4 is a flowchart.

In FIG. 4, (211) identifies Ignition: ON, (150) identifies the Pump driving motor: ON, (213) is the Electrically-driven type FWH driving motor: Forward rotation, with Forward rotation implying an engagement of the clutch, (221) indicates a H4 lock SW, (222) Automatic control SW ON, (230) Slope sensor, (231) Quick acceleration sensor, (232) Slip sensor, (235) High speed travelling sensor with each control or sensor indicating a decision point of the flowchart. 116 is a Two-wheel driving solenoid also indicating a decision point on the flowchart. 213 is an Electrically-driven type FWH driving motor: Reversed rotation, with Reversed rotation implying a release of the clutch and (117) is a Hydraulic control solenoid in the OFF mode.

As can be clarified from the description so far the present invention yields the following favorable effects. As in the case of the full-time four-wheel drive, the tight corner brake phenomenon produced at the time of the low speed steering which is deemed as the most critical defect can be avoided, inasmuch as the differential motion of the clutch becomes possible by regulating or modulating the pressure supplied to the clutch. Further, upon detection of wheel slip, the two-wheel drive is automatically changed to the four-wheel drive and is similarly changed to the direct four-wheel drive in the case of carrying out a quick start and ascending or descending a slope, whereby an automatic four-wheel driving mode similar to the fulltime mode in which a built-in center differential is provided can be obtained. The center differential type requires a lockup clutch (a clutch designed for the direct four-wheel drive) as means for solving a lack of the driving forces when one wheel is slipped. In the present invention, however, the hydraulic clutch can be locked (directly connected) from the differential motion by controlling the hydraulic pressure applied thereto. Inevitably, a low cost of fuel, a decrease in weight and compactness in configuration can be procured by the foregoing arrangement.

As many apparently widely different embodiments of this invention may be made without departing from the spirit and scope thereof, it is to be understood that the invention is not limited to the specific embodiments thereof except as defined as the appended claims.

What is claimed is:

1. In a transfer device constructed such that driving forces are transmitted directly from a transmission to one of the front pair of wheels and the rear pair of wheels and are at the same time transmitted through a wet-type multiple disc clutch to another set of said two wheels, a two-wheel/four-wheel automatic change-over device in an automobile transfer apparatus of a four-wheel drive automobile, comprising:

velocity sensing means for sensing the velocity of the automobile relative to a preset velocity;

slope sensing means for sensing when the automobile is travelling on a slope;

acceleration sensing means for sensing an acceleration of the automobile which is quick relative to a predetermined acceleration;

slip sensing means for sensing a difference between the velocity of the automobile and the rotational velocity of the wheels;

hydraulic valve means for causing a disengagement of the clutch during a two-wheel drive mode, a differential engagement of the disc clutch during a differential four-wheel drive mode of the automobile and for causing a direct engagement of the disc clutch during a direct four-wheel drive mode of the automobile;

a change-over control unit for controlling change-over between two-wheel and four-wheel drive, said unit including;

speed-responsive control means for causing the hydraulic valve means to operate in the two-wheel drive mode in response to the speed sensing means sensing an automobile velocity higher than the preset velocity, slip responsive control means for causing the hydraulic valve means to operate in one of the differential and direct four-wheel drive modes in response to the slip sensing means sensing a difference between the velocity of the automobile and the rotational velocity of the wheels, acceleration and slope responsive control means for causing the hydraulic valve means to operate in the direct four-wheel drive mode in response to at least one of the acceleration sensing means and the slope sensing means.

2. The transfer device of claim 1, wherein said unit further includes solenoid operator means for controlling operation in one of the two-wheel drive and the four-wheel drive.

3. The transfer device of claim 2, further including a selector switch means for energizing said solenoid operator means and establishing said four-wheel drive.

4. The transfer device of claim 1, wherein said unit further includes a plurality of relays with one of said plurality being associated with each of said sensing means.

* * * * *